J. FREY.
Cigar.

No. 203,537. Patented May 14, 1878.

WITNESSES.
W. H. Hicks
C. O. Gordon

Jacob Frey by his attorney A. Sidney Doane
INVENTOR.

UNITED STATES PATENT OFFICE.

JACOB FREY, OF NEW YORK, N. Y.

IMPROVEMENT IN CIGARS.

Specification forming part of Letters Patent No. 203,537, dated May 14, 1878; application filed February 16, 1878.

*To all whom it may concern:*

Be it known that I, JACOB FREY, of the city, county, and State of New York, have invented, made, and applied to use Improvements in Cigars; and that the following is a full, clear, and correct description of the same, reference being had to the accompanying drawings, making a part of this specification, and to the letters of reference marked thereon, in which—

Figure 1:
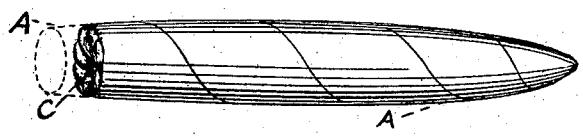
Figure 2:
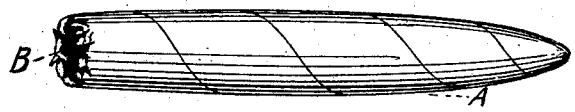

Figures 1 and 2 are perspective views of my invention.

In the drawings like parts of the invention are designated by the same letters of reference.

The nature of the invention relates to an improvement in cigars, as more fully hereinafter described; and consists in a cigar composed of a filler and wrapper, the wrapper being folded, tucked, or turned down upon and over the filler; the object of the invention being that the filler may retain its flavor for a longer time than if the ordinary mode of making a cigar be followed; that when about to use the cigar the central portion of the folded or tucked-in end of the wrapper may be first broken off, and the remaining portion of it and the filler will be simultaneously and thoroughly ignited; and that the ends of cigars are less apt to be broken in being carried, from the protection afforded by the folded or tucked-down portion of the wrapper.

In the drawings, A is the wrapper; B, the filler, and C the tucked-down or folded end of the wrapper.

After the filler has been formed the wrapper is made of sufficient length not only to cover the filler, but that a portion of it shall remain and extend beyond the forward portion or lighting end of the cigar-filler, which extending or projecting portion is subsequently folded or tucked down, so that the forward or lighting end of the filler is enveloped in or by it.

The results already set forth are attained by this mode of manufacture.

Having now set forth my invention, what I claim as new is—

A cigar composed of a filler and wrapper, the wrapper being folded, tucked, or turned down upon and over the filler, for the purposes fully described.

JACOB FREY.

In presence of—
AUGUSTUS FREY,
A. SIDNEY DOANE.